July 29, 1958  G. H. PATTINSON  2,845,163
ENDLESS BELT CONVEYOR SYSTEM
Filed Oct. 25, 1954  3 Sheets-Sheet 1

Inventor
G. H. PATTINSON
By Wenderoth, Lind & Ponack
Attorneys

July 29, 1958  G. H. PATTINSON  2,845,163
ENDLESS BELT CONVEYOR SYSTEM
Filed Oct. 25, 1954  3 Sheets-Sheet 2

Inventor
G. H. PATTINSON
By
Wenderoth, Lind & Ponack
Attorneys

July 29, 1958  G. H. PATTINSON  2,845,163
ENDLESS BELT CONVEYOR SYSTEM
Filed Oct. 25, 1954  3 Sheets-Sheet 3
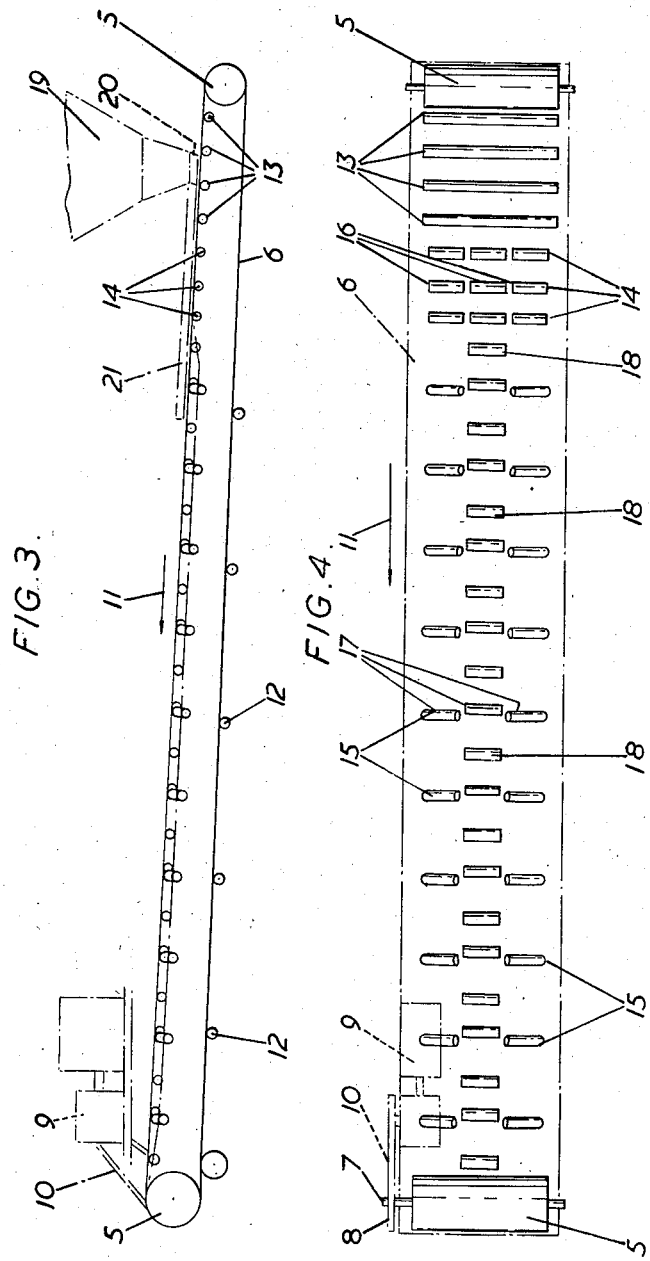
Inventor
G. H. PATTINSON
By
Wenderoth, Lind + Ponack
Attorneys

2,845,163
ENDLESS BELT CONVEYOR SYSTEM

George H. Pattinson, Staines, England

Application October 25, 1954, Serial No. 464,462

2 Claims. (Cl. 198—1)

This invention relates to endless belt conveyor systems.

In bulk conveying of wet materials, such as gravel, in air on a concavely troughed conveyor belt, as customarily employed, it is known that liquid drains from the material and collects in the centre of the belt and this reduces the coefficient of friction between the belt and the material to such an extent that the material tends to slip or lag and does not travel at the same speed as the belt. This is particularly the case when the conveyor belt is upwardly inclined in its direction of travel.

The object of this invention is to provide an improved form of endless belt conveyor by means of which the abovenoted defect is avoided and accordingly the invention provides an endless belt conveyor for the bulk conveyance in air of wet materials, such as gravel, in which the top face of at least the working run of the belt over the whole or over a part of its length, is smooth and slopes downwardly in opposite directions from the central part thereof over the major part of its width so that liquid in the wet bulk material conveyed by the belt will drain to one or other or both of the longitudinal side edges of the belt as the material travels along on the belt.

A dewatering effect is thus obtained which ensures fairly rapid removal of liquid from beneath bulk material on the belt, so that the material soon becomes compacted and can be conveyed without slip if necessary in an upwardly inclined direction.

The reduced liquid content of the bulk material should allow of use if necessary of a greater angle of inclination.

If desired the whole of the length of a conveyor may be convexly cambered and this may be effected by supporting the belt run onsets of rollers which afford to a belt of uniform thickness a cross section of shallow inverted V or of circular arc convex form. For example, the belt may be supported at intervals spaced longitudinally of its length on sets of three rollers, one roller of each set being disposed transversely of the belt under its mid portion and with its longitudinal axis substantially horizontal whilst the other two rollers of each set are disposed on opposite sides of the first mentioned roller with their longitudinal axes downwardly and oppositely inclined with respect to the axis of said first mentioned roller. The rise in the middle of the belt run relatively to the two longitudinal side edges thereof need not be great, for instance, a rise of one to one-and-a-half inches in a belt forty inches wide will usually suffice. The desired effect could be obtained alternatively—or additionally—by using a belt which is thinner at its edges than at its middle and tapers in thickness towards its longitudinal side edges. Where a belt of this kind is used which is not supported on sets of rollers as aforesaid, the lower face of the belt may be substantially flat so that its upper or top face presents a surface of the desired form.

The rate at which liquid can be drained from wet bulk material by convexly cambering the conveyor belt will usually be so rapid that only part of the length of an installation need be of convex cambered form. Accordingly, it is convenient to provide for any long belt installation a separate "dewatering" conveyor, that is, a separate endless belt conveyor having the top face of the working run convexly cambered according to the present invention. This separate conveyor may employ a belt which is wider than that employed for the remainder of the installation, which may consist of flat or of concavely troughed belting. The dewatering conveyor preferably runs at a slower speed than the belt it is feeding.

In order that the present invention may be more clearly understood and readily carried into effect reference may now be had to the accompanying drawings illustrating the invention by way of example and in which:

Figure 3 is a schematic view of the belt conveyor embodied in the apparatus shown in Figure 1 viewed from one side, and Figure 4 a plan view of Figure 3 showing the arrangement of the rollers for supporting the belt conveyor itself.

Figure 1:
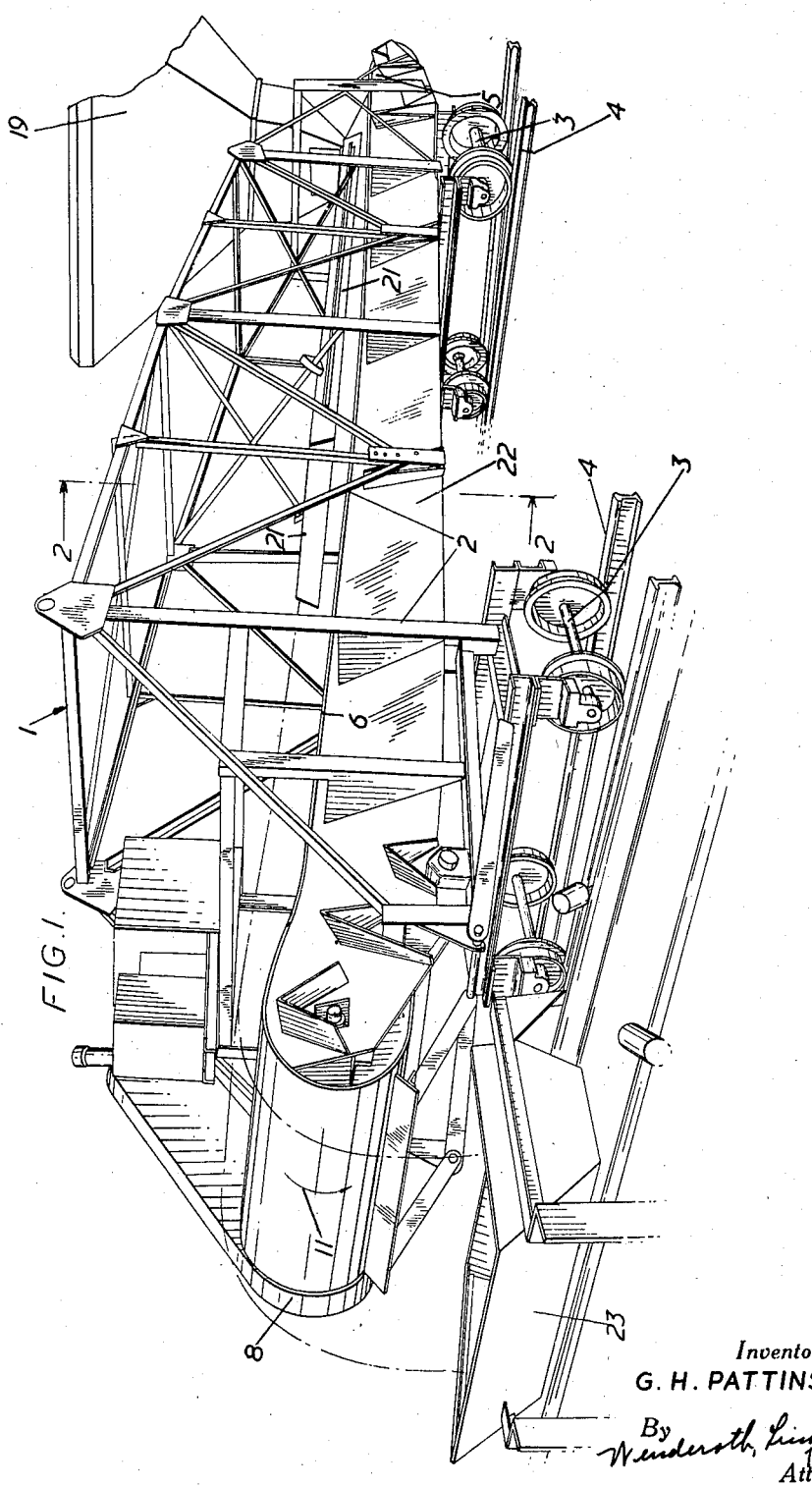
Figure 1 is a perspective view of an endless belt conveyor system embodying the present invention for conveying gravel dug from a pit to a discharge point.

In digging for gravel, the strata containing the gravel is frequently well below the surface of the earth and as the gravel is dug the pit from which it is obtained becomes partially or wholly filled with water. Consequently the buckets of the machinery by which the gravel is dug contain a relatively large amount of water as well as the gravel, and it is necessary to remove this water, or the major part of it as rapidly as possible.

Usually the digging machinery deposits the gravel and the water on a conveyor belt which transports the gravel to a delivery point and in the usual form of conveyor system the belt itself has or tends to assume a more or less concave cross sectional form. The water therefore tends to collect in the mid-portion of the belt with the result that the coefficient of friction between the gravel and the belt tends to be reduced to such an extent that the gravel tends to slip or drag relatively to the belt and does not travel at the same speed as the belt. In an endeavour to drain away the water the belt may be inclined longitudinally but for various reasons this is not wholly satisfactory.

According to this invention the above mentioned defect of known conveyor belt systems is overcome by arranging for the top face of at least the working run of the belt over the whole or part of its length, to be of convex or other cambered or equivalent form in cross section.

The apparatus shown in the accompanying drawings depicts a conveyor belt system embodying a conveyor belt according to the present invention for handling gravel as it is dug from a pit and comprises a frame, depicted generally by the reference numeral 1, built up of angle irons 2 of various forms and provided at each end with sets of wheels 3 to enable the frame to be moved bodily along the bank of the pit with the longitudinal axis of the frame extending substantially at right angles to the rim of the pit. The wheels may be of the flanged type adapted to run on rails 4 or of any other suitable type and the sets of wheels 3 may be mounted on bogie subframes so that the frame 1 may be moved readily in directions other than that indicated.

Figure 2:
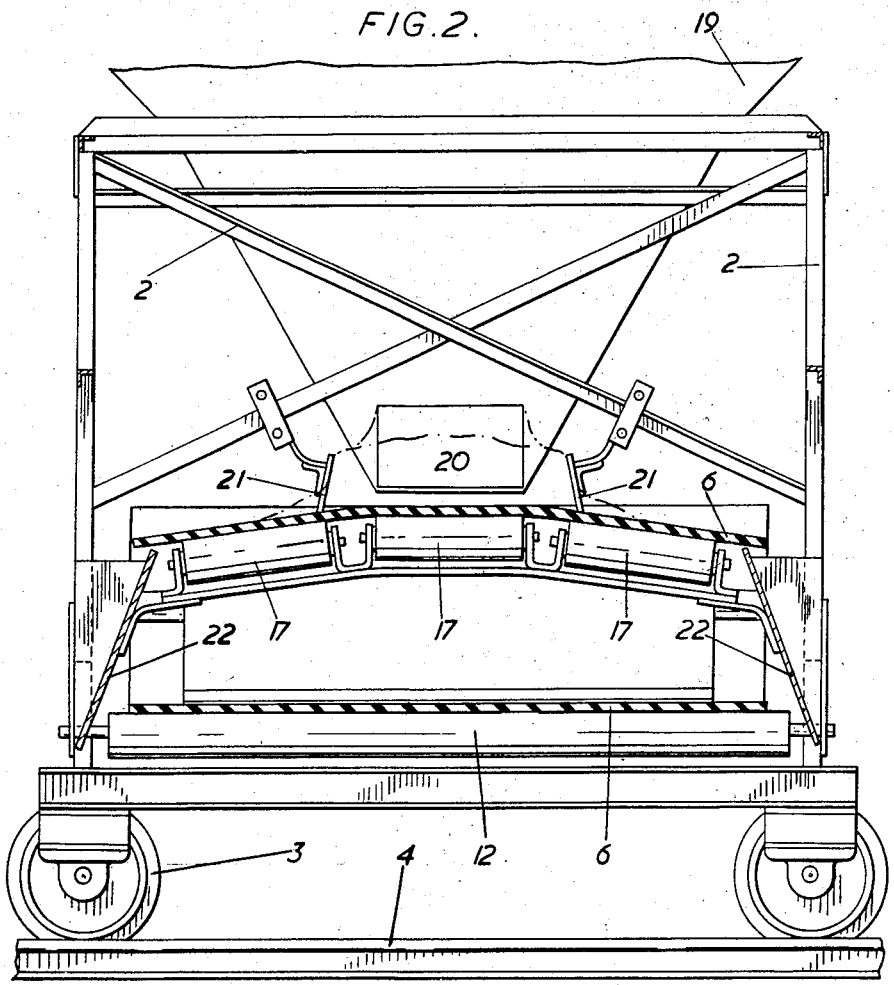
Figure 2 is a cross-sectional view on the line 2—2 of Figure 1.

Mounted at each end of the frame 1 is a horizontally disposed roller 5 and a continuous conveyor belt 6 extends around the rollers 5 as shown in Figure 1 and also schematically in Figures 3 and 4. The shaft 7 of the roller 5 at the rear end of the frame is provided with a belt wheel 8 by which the shaft 7 and consequently the roller 5 is rotated from a prime mover 9 through belting, gearing or the like 10 in the direction indicated by the arrow 11. The shaft of roller 5 at the forward end of the frame 1 is mounted in bearings carried by the frame for free rotation and the lower length of belt between the rollers 5 is supported at intervals on rollers 12 mounted for free rotation in suitable bearings carried by the frame as shown in Figure 2. The upper length of belt 6 between the rollers 5 is supported on a system of freely rotatable rollers in the manner shown schematically in Figures 3 and 4 and also partially in Figure 2. As shown more particularly in Figure 4 this system of rollers comprises essentially four rollers 13 adjacent the front roller 5 and which extend wholly or substantially wholly across the full width of the belt 6, three sets of these rollers 14 and a number of sets of rollers 15. Each set of rollers 14 includes three short rollers 16, the middle roller of each set being arranged below the longitudinal axis of the belt and the other rollers of each set being disposed on opposite sides of the middle roller transversely of the belt with their longitudinal axes in line and coaxial with the longitudinal axis of the middle roller. The sets of rollers 15 each comprise three rollers 17, the middle roller of each set being disposed transversely of the belt and with its longitudinal axis horizontal below the longitudinal axis of the belt, and the other two rollers being disposed on opposite sides of the middle roller with their longitudinal axes oppositely inclined to the longitudinal axis of the midle roller. As shown in Figure 4 the longitudinal axes of the two outer rollers are disposed in a plane which is slightly displaced from the plane containing the axes of the middle roller.

As shown in Figures 3 and 4 the spacing of the rollers 13 and the sets of rollers 14 is approximately the same but the spacing between the sets of rollers whilst being equal is substantially greater than the spacing of the rollers 13 and the sets of rollers 14, and, if desired, additional single rollers 18 disposed with their longitudinal axes horizontal and extending transversely of the belt may be disposed beneath the longitudinal axis of the belt between the sets of rollers 17 as shown.

The rollers 13 and 18 and the individual rollers of the sets of rollers 14 and 15 are mounted on the frame 1 so as to be freely rotatable.

In passing over the various rollers 12, 13 and the sets of rollers 14, 15, the cross sectional contour of the belt 6 is determined largely by the disposition of the rollers or sets of rollers. For example, when passing over the rollers 12, 13 and the sets of rollers 14 the belt is substantially flat but when passing over sets of rollers 15 the belt assumes a convex form in cross section as shown clearly in Figure 2.

19 is a hopper into which the material to be conveyed by the belt is deposited. The hopper 19 is located at one end of the belt and its outlet 20 is positioned above the central portion of the belt guide strips 21 supported by the frame 1 being provided to confine the material in its initial movement with the belt.

As shown the arrangement is such that the belt 6 has a slight upward inclination from its forward to its rearward end to assist in draining off the water and downwardly inclined baffles 22 are supported by the frame adjacent the side edges of the belt 6 to suitably deflect the water falling off the belt edges.

In the use of the apparatus described, assuming that the belt is being moved in the direction of the arrow 11 by the prime mover 9 through the belting, gearing or the like 10, the material to be conveyed, in this case a mixture of gravel and water, is continuously fed on to the belt 6 from the hopper 19, and is confined on the belt by the guide strips 21. As the material is conveyed along water is drained from the gravel over the side edges of the belt in that part of the travel of the belt when it is supported by the sets of rollers 15 which impart to the belt a convex form in cross section, the water as it falls from the edges of the belt being suitably deflected by the baffles 22. In addition a certain amount of water is separated from the gravel due to the longitudinal inclination of the belt 6 with the result that when the gravel is discharged from the belt 6 into the receptacle 23 at the rearward end of the conveyor a substantial part of the water content thereof has been separated.

In the system described the belt is of uniform thickness but it will be appreciated that the de-watering effect may be enhanced by the use of a belt which tapers in thickness from its central portion towards its longitudinal side edges. When such a belt is employed the rollers 17 of the sets 15 may be arranged in an identical manner to the rollers 16 of the sets 14 if the taper in thickness of the belt is sufficient. The lower face of the belt will therefore be substantially flat but its upper or top face will present a surface of the desired form.

What I claim is:

1. An endless belt conveyor for the bulk conveyance of wet materials, such as gravel, comprising a smooth endless belt having an upper run inclined upwardly along its length at an angle to the horizontal and in the direction of travel of the upper run, a portion of the upper run of said belt nearest the lower end thereof being level transversely to its width, and the remainder of the upper run of said belt sloping downwardly in opposite directions from the central part thereof over the major part of its width, and guide strips positioned above the upper run of said belt and extending along the length of said belt over said portion of said upper run and over only the initial part of the remainder of the upper run of said belt, whereby the wet material being conveyed is guided only during the initial period of draining on the said portion of the upper run and along the initial part of the remainder of the upper run, and the liquid in the wet material can drain to the longitudinal side edges of the belt on the remainder of the upper run.

2. An endless belt conveyor as claimed in claim 1 in which the remainder of the upper run is supported on a plurality of groups of rollers spaced from each other along the length of the upper run, the axes of the rollers in each group which support the edge of the belt being at an angle to and offset along the length of the belt relative to the axis of the roller in each group supporting the center of the upper run of the belt.

References Cited in the file of this patent

UNITED STATES PATENTS

| 1,108,186 | King | Aug. 25, 1914 |
| 1,949,847 | Stockdale | Mar. 6, 1934 |

FOREIGN PATENTS

| 825,571 | France | Dec. 8, 1937 |